United States Patent [19]

Irwin

[11] Patent Number: 4,508,468
[45] Date of Patent: Apr. 2, 1985

[54] LOCKING COUPLING

[76] Inventor: Lawrence F. Irwin, 12869 San Fernando Rd., Sylmar, Calif. 91342

[21] Appl. No.: 425,671

[22] Filed: Sep. 28, 1982

[51] Int. Cl.³ ............................................. F16B 12/20
[52] U.S. Cl. .................................... 403/328; 403/109; 403/361
[58] Field of Search ........................ 403/328, 109, 361; 248/188.5; 211/105.3

[56] References Cited

U.S. PATENT DOCUMENTS

| | | | |
|---|---|---|---|
| 1,655,750 | 1/1928 | Campo | 70/371 UX |
| 2,707,385 | 5/1955 | Fisler | 70/371 UX |
| 2,719,688 | 10/1955 | Seifert | 248/188.5 |
| 3,214,187 | 10/1965 | Fuerst | 403/328 X |
| 3,355,148 | 11/1967 | Botello et al. | 15/104.3 S N |
| 3,978,698 | 9/1976 | Ono | 70/229 |
| 4,403,885 | 9/1983 | Babb | 403/317 |

Primary Examiner—Richard J. Scanlan, Jr.
Attorney, Agent, or Firm—James E. Brunton

[57] ABSTRACT

An improved coupling for lengths of coiled springs, flexible rods and the like comprising interfitting inner and outer members and latching elements carried by the inner member and received in openings in the outer member. The latching elements are uniquely configured so as to be operable with one hand leaving the second hand free to grasp one of the connected springs or rods.

2 Claims, 5 Drawing Figures

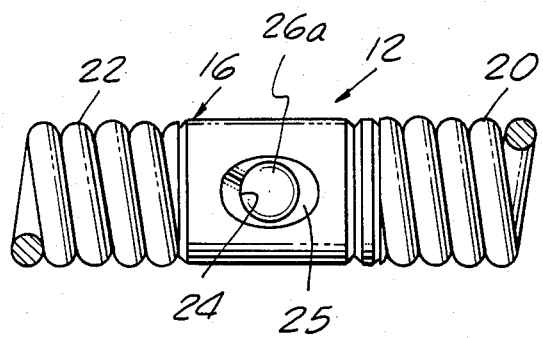
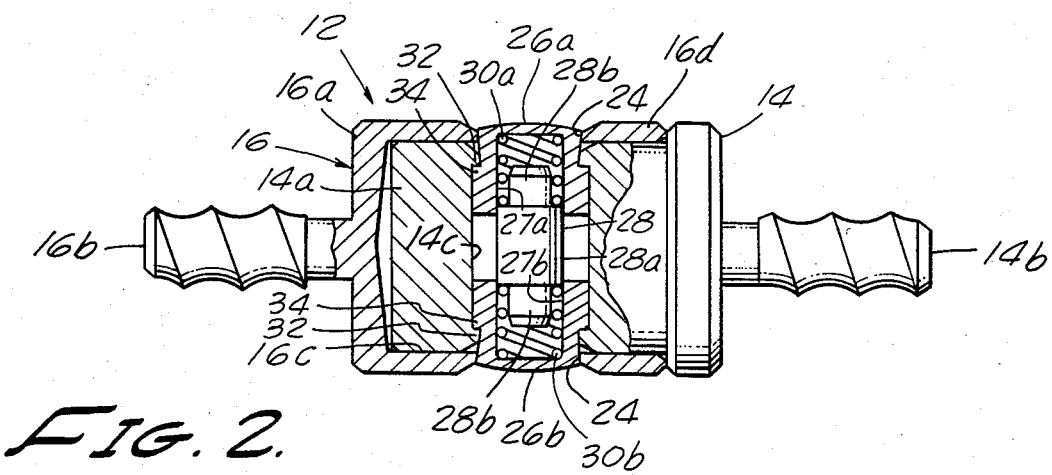
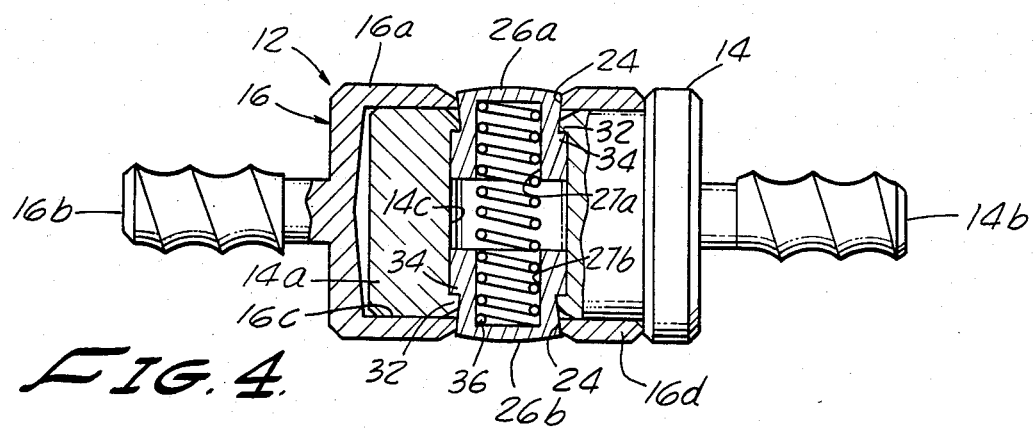
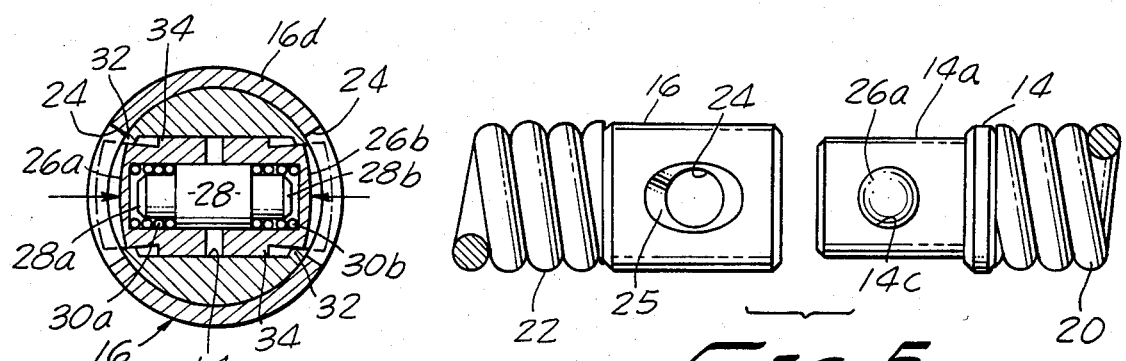

LOCKING COUPLING

BACKGROUND OF THE INVENTION

1. Field of the Invention

The present invention relates generally to tools used by plumbers for clearing obstructions from waste lines, such as plumbers' snakes and sewer rods. More particularly, the invention relates to means for releasably interconnecting sectons of elongated elements, such as sections of flexible plumbers' snakes and sewer rods.

2. Discussion of the Prior Art

Plumbers commonly use elongated coiled spring elements known as plumbers' snakes for clearing waste lines of stoppages. A cutting or entangling tool is usually attached to the front end of a section of snake and the snake inserted and advanced through the pipeline by rotating it as it is advanced. Depending upon the distance of the obstruction in the pipe from the place where the snake is inserted, it often is necessary to attach additional lengths of snake to the first section in order to have sufficient over-all length to reach and clear the obstruction. Similarly, in some cases sectional sewer rods of much shorter length than the snakes are used and these must be coupled together as they are successively inserted in the pipe.

Heretofore considerable difficulty has been experienced in attaching and detaching the sections of plumbers' snakes and sewer rods because of the nature of the joints, many of which are cumbersome, require a tool for the operation, and are time consuming to operate. Also, many couplings are unsatisfactory in that they tend to loosen and become disconnected. If the sections of plumbers' snake become disconnected in the line great difficulty can be experienced in retracting the disconnected section. If the section cannot be successfully "fished" from the line, the lines must be severed and then rejoined, often at great expense.

One of the most successful prior art coupling known to applicant is that disclosed in the U.S. Pat. No. 3,449,003 to Hunt. The device of this patent has been used by the common assignee of the present application for a number of years. Experience has shown, however, that a substantial drawback of this prior art coupling resides in the fact that longitudinally offset release buttons calls for a double pressure and requires a seek and find approach to locate the two finger areas at which pressure is to be exerted. Additionally, in some cases two hands are required for effective disconnect of the coupling. The unique coupling of the present invention effectively overcomes the drawbacks of the Hunt device since the release buttons are aligned making the device readily operable with the fingers of one hand and eliminating the seek and find approach.

SUMMARY OF THE INVENTION

An object of the invention is to provide a new and improved coupling or joint for connecting two members which may be used for a variety of purposes but which is particularly designed and suited for connecting together sections of plumbers' snakes and sewer rod sections as well as connecting tools to these elements.

A particular object is to provide a coupling of the aforementioned character which is easily operable by the fingers of one hand without any tools or outside assistance to quickly connect or disconnect two elements.

A further object is to provide such a coupling that is positively self-locking to the extent that when the elements thereof are inserted one within the other the device will lock upon relative rotation of the parts.

Another object is to provide a coupling of the character described having a special single locking button means designed to take maximum stress under operation and at the same time is so constructed that it is protected from being operated inadvertently by extraneous objects within a pipeline or the like.

A further object of the invention is to provide a coupling embodying a locking button means which is self-contained and is designed to have maximum travel without projecting beyond the parts.

Still a further object of one form of the invention is to provide a coupling embodying an internally disposed reinforcing element adapted to prevent separation of the sections of snakes or rods when the assemblage is placed under severe axial loads.

Yet another object is to provide a construction embodying a novel locking button means having the safety features that the locking buttons do not project beyond the outermost element of the coupling and that it is necessary to fully depress both buttons in order to disassemble the coupling.

Still another object is to provide a coupling embodying a greater fail safe system against accidental disconnect of the coupling. With the diametrically opposed double release buttons, when one button is depressed to a greater extent that the other, the opposing button cannot depress further to allow disconnect. In point of fact, the operation of depressing one button only increases the outward pressure exerted against the opposite button which tends to positively prevent accidental decoupling of the device.

These and other objects will be apparent from the drawing and the following description.

BRIEF DESCRIPTION OF THE DRAWINGS

FIG. 1 is a side elevational view of the coupling interconnecting two lengths of coiled spring.

FIG. 2 is an enlarged side elevational view of the coupling itself, partly broken away to show internal construction.

FIG. 3 is a transverse cross-sectional view of the coupling showing the coupling release buttons in a retracted position.

FIG. 4 is a side elevational view similar to FIG. 2 showing another form of coupling of the present invention.

FIG. 5 is a side elevational view similar to FIG. 1 but showing the locking coupling as it appears with the male portion disconnected from the female portion.

DESCRIPTION OF PREFERED FORMS OF THE INVENTION

Refering to the drawings, and particularly to FIGS. 1 and 2, one form of the coupling of the present invention for releasably interconnecting sections of coiled spring, rod, or the like is generally designated by the numeral 12. More particularly numeral 12 generally designates the coupling as a whole. As best seen by referring to FIG. 2, the coupling 12 comprises first and second cooperating members 14 and 16. First member 14 includes a cylindrical portion 14a and an end portion 14b formed to permit the attachment thereof to one of the elements to be interconnected. Cylindrical portion 14a is provided with a transverse bore 14c, the purpose of which will presently be described.

Second member 16 also has a cylindrical portion 16a and an end portion 16b formed to permit the attachment thereof to the other of the elements to be interconnected. In the particular embodiment shown in the drawings, each of the end portions 14b and 16b is shown provided with a spirally grooved or threaded stem for the reason that these particular coupling elements are designed to be mounted on the ends of coil spring plumbers' snake sections 20 and 22 respectively (FIG. 1). Any suitable means may be used for securing the ends of the plumbers' snakes to the coupling element. It is to be understood, of course, that the coupling elements 14 and 16 may be attached to members other than plumbers' snake sections shown in FIGS. 1 and 5 and in such cases the end portions of the coupling elements would be differenently formed.

Referring again to FIG. 2, the second member 16 is provided with an axially extending cylindrical bore 16c defining the outer wall portion 16d which is substantially annular shaped in cross-section along the length of the cylindrical portion 16a. As indicated in the drawings, cylindrical bore 16c is adapted to closely receive cylindrical portion 14a of member 14 when the members are in mating engagement. Cylindrical wall 16d is also provided with diametrically opposed apertures 24 formed intermediate the length of the wall portion 16d.

Also forming a part of the coupling of the invention are latching means shown here as first and second locking buttons 26a and 26b partially carried within the transverse bore 14c of first member 14. Buttons 26a and 26b are axially movable within bore 14c in the manner illustrated in FIG. 3 to a position wherein they are completely disposed within transverse bore 14c. Each button is also provided with an axially extending internal bore 27a and 27b.

As indicated in FIG. 2, when the coupling members 14 and 16 are in mating engagement, buttons 26a and 26b are located so as to be closely receivable within the apertures 24 formed in the outer wall 16d of member 16.

Carried within the transverse bore 14c, in operable engagement with first and second buttons 26a and 26b is reinforcing means shown here in the form of a reinforcing element 28. In this embodiment of the invention, reinforcing element 28 comprises a generally cylindrically shaped element having a body portion 28a and spaced apart reduced diameter end portions 28b. These end portions and a portion of the body portion 28a are receivable within the internal bores 27a and 27b formed in locking buttons 26a and 26b respectively. With this construction the reinforcing element acts to reinforce the structure and serves to resist any substantial axial loading which may be placed on the assemblage tending to separate members 14 and 16.

Biasing means are provided to urge buttons 26a and 26b transversely outwardly within transverse bore 26b formed in member 14 whereby, in the mating configuration shown in FIG. 2, the outer ends of the buttons will protrude through apertures 24 formed in member 16. In the embodiment of the invention shown in FIG. 2, the biasing means is provided in the form of first and second coiled springs 30a and 30b. As indicated in FIG. 2, coiled spring 30a is disposed between reinforcing element 28 and first button 26a for urging separation therebetween. Similarly, second coiled spring 30b is disposed between reinforcing element 28 and locking button 26b for urging separation between these elements. Preferably coiled springs 30a and 30b are closely received within the axial bores formed in the locking buttons with the outer ends thereof in engagement with the internal walls of the locking buttons and with the inner ends thereof in engagement with the shoulders formed at the junction between the center portion and end portions of reinforcing element 28. To limit the extent of separation between the first and second locking buttons due to the urging of springs 30a and 30b, there is provided interengaging means associated with first member 14. More specifically, these interengaging means limit the extent of separation between the locking buttons so that as previously mentioned, the ends of the buttons protrude through apertures 24, but are at all times maintained within the peripheral limits of second member 16 in the area of the apertures 24. In the form of the invention shown in FIG. 2, the interengaging means comprise deformations 32 formed around the outer extremities of transverse bore 14c. These inward deformations 32, which may be formed by mechanical peaning or the like, are normally engaged by shoulders 34 formed on each of the buttons 26a and 26b so as to prevent outward movement of the buttons beyond that shown in FIG. 2.

As best seen by referring to FIGS. 1 and 5, the thin wall portions 16a are dished around each of the diametrically opposed apertures 24 (indicated by the numeral 25) to facilitate manually depressing the locking buttons with the fingers of one hand against the urging of the biasing means.

With the members 14 and 16 in mating engagement as shown in FIG. 2, it can be seen that the parts are so dimensioned that when assembled, the outer ends of the locking buttons do not project beyond the periphery of the second member 16d and consequently there is no likelihood of the buttons being inadvertently depressed when the device is in use in a wasteline or the like. Also it is apparent that to disconnect the parts it is necessary to fully depress both buttons 26a and 26b in the manner shown in FIG. 3. It is also apparent that both buttons must be fully depressed at the same time against the urging of springs 30a and 30b in order that member 14 along with buttons 26a and 26b can be withdrawn from the axial bore formed in member 16. Once the buttons are depressed by the fingers of one hand through exertion of forces in the direction of the arrows in FIG. 3, the coupling can be readily separated in the manner shown in FIG. 5.

In FIG. 4 there is shown another form of the coupling of the present invention. In this embodiment of the invention, most of the component parts are identical to those shown in FIG. 2 and previously described herein. Accordingly, like numbers are used in FIG. 4 to identify like parts.

The principal difference between the embodiments of the invention shown in FIGS. 2 and 4 is the absence of the reinforcing means or reinforcing member 28 in the form of the invention illustrated in FIG. 4. While the use of the reinforcing member provides additional strength to the unit and aids in the prevention of accidental separation between the coupling when axial forces of great magnitude are exerted tending to separate members 20 and 22, such forces are not normally encountered. The axial loading exerted on members 20 and 22 is normally small so that the device of the invention, in most applications, will function quite satisfactorily without the necessity for the presence of the reinforcing element 28.

Referring to FIG. 4, it can also be seen that the biasing means in this form of the invention comprises a single elongated coil spring 36 which is receivable within the internal, axial bores 27a and 27b formed in the buttons 26a and 26b. Spring 36 extends substantially the length of the transverse bore 14c formed in first member 14 and functions to urge separation of the locking buttons 26a and 26b so that the buttons will normally be maintained in engagement with the interengaging means or depressions 32 formed proximate the outer ends of transverse bore 14c. Disassembly of the coupling is accomplished in the manner previously described and can readily be accomplished using the fingers of one hand to exert forces tending to move the buttons inwardly of bore 14c against the urging of spring 36.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A coupling for releasably interconnecting two elements such as sections of coiled spring, rod, or the like comprising:
   (a) a first member having a cylindrical portion and an end portion formed to permit the attachment thereof to one of the elements to be interconnected, said cylindrical portion having a transverse bore extending therethrough;
   (b) a second member having a cylindrical portion and an end portion formed to permit the attachment thereof to the other of the elements to be interconnected, said cylindrical portion having a cylindrical bore extending axially thereof defining a thin outer wall substantially annular shaped in cross-section along the length of said cylindrical portion, said outer wall having diametrically opposed apertures formed therein intermediate its length, said cylindrical bore being adapted to closely receive said cylindrical portion of said first member;
   (c) first and second locking buttons partially carried within said transverse bore of said first member and being movable axially thereof, each of said first and second buttons having an axially extending bore, said buttons being located so as to be receivable within the apertures formed in the outer wall of said second member, when said cylindrical portion of said first member is inserted into the cylindrical bore formed in said second member;
   (d) reinforcing means carried within said transverse bore of said first member in engagement with said first and second buttons for resisting axial separation of said first and second members when said members are mated with said buttons received within the apertures formed in the outer wall of said second member, said reinforcing means comprising a generally cylindrically shaped reinforcing element having a body portion and reduced diameter end portions, defining first and second shoulders, one of said end portions being receivable within the axial bore of said first button and the other of said end portions being receivable within the axial bore of said second button;
   (e) a first coiled spring disposed between said reinforcing means and said first button for urging separation therebetween;
   (f) a second coiled spring disposed between said reinforcing means and said second button for urging separation therebetween; and
   (g) interengaging means associated with said first member for limiting the extent of separation between said first and second buttons and said reinforcing means whereby the outer ends of the buttons are within the peripheral limit of the outer member in the general area of said opening therein, said parts of said coupling being so constructed and arranged as to allow the fingers of a hand to simultaneously depress said first and second buttons.

2. A coupling as defined in claim 1 in which said first coiled spring is disposed within the axial bore of said first button in engagement with said first shoulder of said reinforcing element and in which said second coiled spring is disposed within the axial bore of said second button in engagement with said second shoulder of said reinforcing element.

* * * * *